US 6,669,396 B2

(12) United States Patent
Mattle

(10) Patent No.: US 6,669,396 B2
(45) Date of Patent: Dec. 30, 2003

(54) CONNECTING ELEMENT FOR CONNECTING AT LEAST TWO WOODEN CONSTRUCTION PARTS AND A JOINT PLATE

(75) Inventor: Paul Mattle, Widnau (CH)

(73) Assignee: SFS Industrie Holding AG, Heerbrugg (CH)

( * ) Notice: Subject to any disclaimer, the term of this patent is extended or adjusted under 35 U.S.C. 154(b) by 0 days.

(21) Appl. No.: 09/956,677

(22) Filed: Sep. 20, 2001

(65) Prior Publication Data

US 2002/0025217 A1 Feb. 28, 2002

Related U.S. Application Data

(63) Continuation of application No. 09/445,544, filed as application No. PCT/EP98/03266 on Jun. 2, 1998, now abandoned.

(30) Foreign Application Priority Data

Jun. 9, 1997 (DE) .......................................... 197 24 285

(51) Int. Cl.[7] .............................. F16B 25/00; B27F 1/00; B27G 15/00; E04B 1/48; E04B 1/49
(52) U.S. Cl. ..................... 403/294; 403/230; 403/292; 403/300; 403/234; 411/387.6; 411/387.7; 29/428; 29/525.01; 29/525.11
(58) Field of Search ................................. 403/294, 230, 403/292, 300, 234; 411/387.7, 387.6; 29/428, 525.01, 525.11

(56) References Cited

U.S. PATENT DOCUMENTS

| 1,539,826 A | 6/1925 | Boutelle ........................ 351/99 |
| 3,312,127 A | 4/1967 | Stafford ...................... 408/226 |
| 3,333,490 A | 8/1967 | Popin .......................... 408/226 |
| 3,478,639 A | 11/1969 | Gruca ...................... 411/387.1 |
| 3,665,801 A | * 5/1972 | Gutshall ................... 411/387.7 |
| 3,739,682 A | 6/1973 | Siebol et al. ............. 411/387.2 |
| 3,827,331 A | 8/1974 | Muenchinger ........... 411/387.4 |
| 4,034,641 A | 7/1977 | Williams, Jr. et al. ... 411/387.7 |
| 4,526,418 A | * 7/1985 | Martin ......................... 403/294 |
| 5,234,294 A | 8/1993 | Hoppe et al. ................. 408/67 |
| 5,253,945 A | * 10/1993 | Hosokawa ................... 403/258 |
| 5,433,570 A | 7/1995 | Koppel ........................ 411/392 |
| 5,536,127 A | 7/1996 | Pennig ........................ 411/413 |
| 5,577,856 A | * 11/1996 | Tezuka ........................ 403/294 |
| 5,620,275 A | * 4/1997 | Novacek ..................... 403/230 |
| 5,921,049 A | * 7/1999 | Sugiyama ................... 403/230 |
| 5,938,366 A | * 8/1999 | Novacek ..................... 403/230 |
| 6,032,431 A | * 3/2000 | Sugiyama ................... 403/230 |

FOREIGN PATENT DOCUMENTS

| CH | 680674 | 10/1992 | |
| DE | 1500798 | 3/1970 | |
| DE | 1752019 | 8/1971 | |
| DE | 2555647 | 6/1977 | |
| DE | 236563 A1 | * 6/1986 | ........... F16B/25/00 |

(List continued on next page.)

Primary Examiner—Gregory J. Binda
Assistant Examiner—Ernesto Garcia
(74) Attorney, Agent, or Firm—Volpe and Koenig, P.C.

(57) ABSTRACT

In a joint between two wooden structural members (2 and 3) there is inserted a joint plate (4), whose foot part (5) is joined abuttingly to the wooden structural member (2) by screws (7). The joint plate (4) is pushed into a slot (8) of the wooden structural member (3), whereupon connecting elements (1) are inserted in appropriate number through the wooden structural member (3) and the joint plate (4). Such a connecting element is provided at one of its ends with a boring part (11) and at its other end with a tool drive (12). The worked-off material is received by a portion (14) of smaller cross section and appropriate flutes (13). In addition, an axially secure relationship after setting is achieved with a thread (15) at one end of the connecting element. After it has been finally set, the connecting element (1) is seated in an exact fit as the fixation between the joint plate (4) and the wooden structural member (3) in its self-drilled hole.

14 Claims, 4 Drawing Sheets

FOREIGN PATENT DOCUMENTS

| | | |
|---|---|---|
| DE | 3828446 | 3/1990 |
| DE | 3841638 | 6/1990 |
| DE | 3914618 | 11/1990 |
| DE | 4112591 | 8/1992 |
| DE | 4216198 | 11/1993 |
| DE | 4315101 | 11/1994 |
| DE | 4440437 | 2/1996 |
| FR | 1011877 | 4/1949 |
| FR | 2590191 | 5/1987 |
| GB | 736490 | 9/1955 |
| GB | 2067440 | 7/1981 |
| JP | 55320 | 3/1994 |
| RU | 1696175 | 12/1991 |
| WO | 9111632 | 8/1991 |

\* cited by examiner

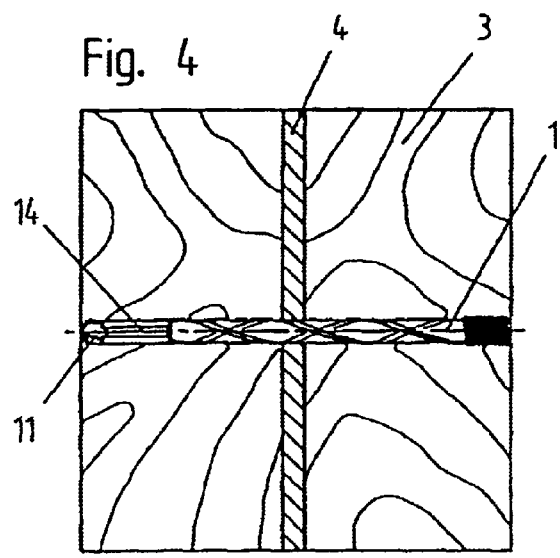
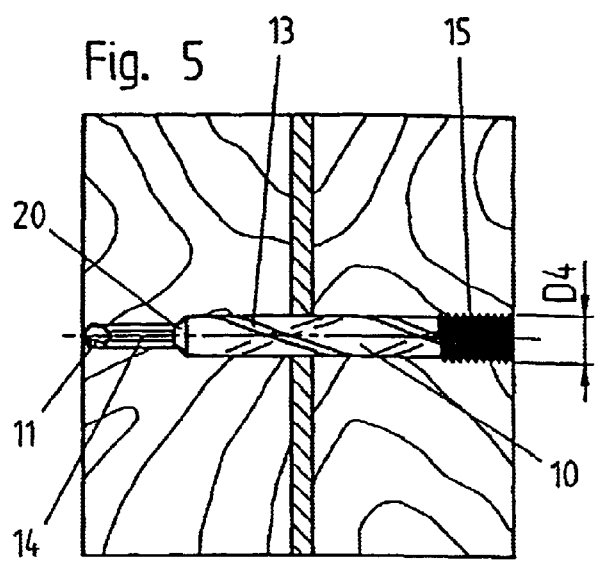
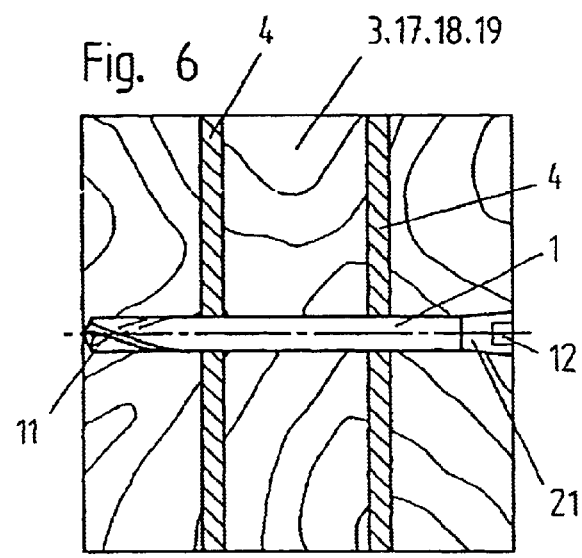
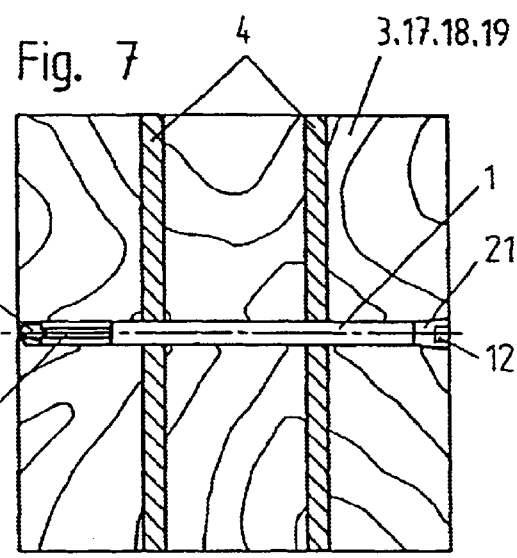
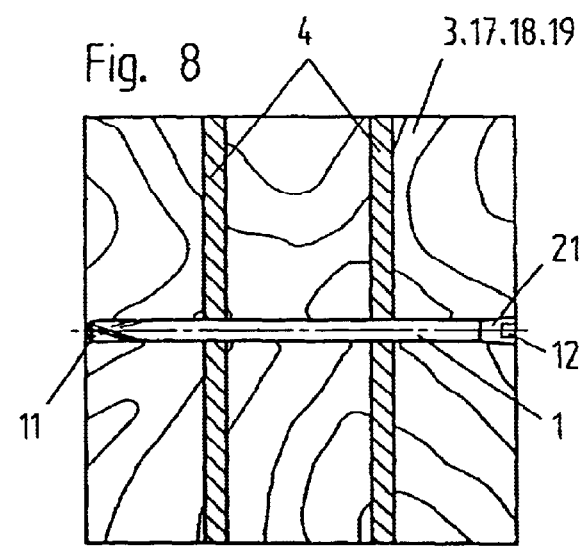
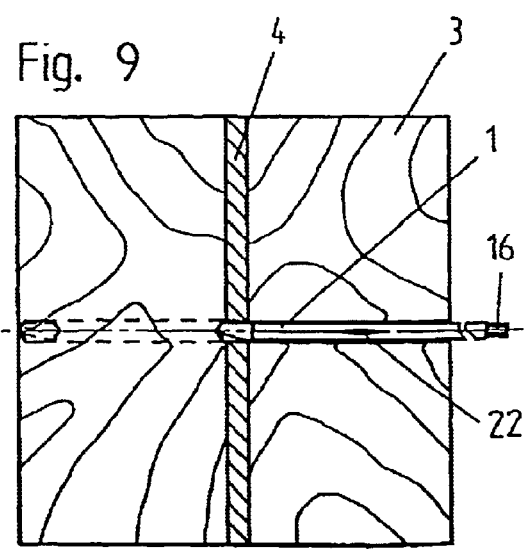

CONNECTING ELEMENT FOR CONNECTING AT LEAST TWO WOODEN CONSTRUCTION PARTS AND A JOINT PLATE

This application is a continuation of U.S. patent application Ser. No. 09/445,544, filed Dec. 8, 1999, abandoned, entitled Connecting Element For Connecting At Least Two Wooden Construction Parts And A Joint Plate, which is a 371 National Phase Application of International Application No. PCT/EP 98/03266, filed Jun. 2, 1998.

BACKGROUND OF THE INVENTION

The invention relates to a connecting element with a substantially rod-like shank for joining at least two wooden structural members and at least one joint plate, especially of the type that can be inserted into one or more slot(s) of the wooden structural members, and preferably made of metal.

1. Field of the Invention

2. Prior Art

In truss or frame constructions, the wooden structural members used are usually connected by joint plates made of metal. The joint plates are inserted in central slots at the ends of the wooden structural members. In the wooden structural members and the joint plates there are provided holes in a coinciding pattern, in which holes there are usually inserted plain dowels. These plain metal dowels fix the joint plate in the wooden structural member in question. To ensure that the plain dowel can transmit the forces specified according to standards between the wooden structural members and the joint plate, and that a joint which is as rigid as possible and prevents mutual displacement can be formed, the holes in both the wooden structural members and in the joint plate must be matched relatively closely and fittingly to each other.

Since two different materials are used here, namely wood on the one hand and the metal joint plate on the other hand, special problems arise in making the holes. The usual practice heretofore—in order to be able to meet drilling tolerances—has been to drill the holes in the wooden structural members first. The joint plate is then inserted into the slot of the wooden structural members, whereupon the holes are made in the joint plate, so that the already completed holes in the wooden structural members form a kind of hole gauge, as it were. The holes in the joint plate are now made with a suitable drill, and the plain dowels for mutually joining the wooden structural members and joint plate are hammered in. On the one hand this working principle is very laborious, and on the other hand a rigid and load-bearing joint cannot be achieved therewith, since the accuracy of fit is not optimal.

In another known working principle, the holes are made first of all in the joint plate. This joint plate is then used as a template for drilling the holes in the wooden structural members. Since in such a case the ultimate position of the joint plate is axially offset relative to the drilling process, corresponding inaccuracies can be introduced here also, and so dimensional tolerances may not necessarily be met. Furthermore, this working principle is also very cumbersome and time-consuming.

According to yet another known method (German Patent C-43 15 101), the joint plate is first inserted in the appropriate slot in the wooden structural member. While this condition of insertion in correct position is maintained, the holes are made through the wooden structural members and the joint plate by means of a drilling jig. For this purpose there is used a kind of variable-speed drill, in order to be able to cope with the different conditions of drilling in wood and in metal. After the hole has been completed, the plain dowels can be appropriately hammered in.

A special holder for the drilling jig is needed even in such a known embodiment, since it is also necessary to ensure that the joint plate inserted into an appropriate slot in the wooden structural member cannot shift.

Precisely for working on the construction site itself does such an arrangement cause problems, because the use of particularly large and bulky jigs on the building is associated with cumbersome handling. Furthermore, accessibility for such a drilling jig is not available everywhere.

From German Patent Application A-41 24 553 there is also known a connector for covered beam joints, with the purpose of avoiding exact measuring and drilling work. Nails are hammered in to join the wooden structural member and the joint plate, without making holes beforehand. For this purpose, however, the joint plate must have a very special construction, in order to permit it to be penetrated at all by nails. Thus it must be ensured that the joint plate region through which nails will be driven comprises thin sheet metal. Providing this special region introduces the risk that the nails will bend or that cracking will occur, since such joint plates are usually inserted at the end faces of wooden structural members.

SUMMARY OF THE INVENTION

The object of the present invention is therefore to provide a connecting element of the type cited in the introduction, with which wooden structural members and joint plates can be joined with accurate fit and, in fact, with simple handling regardless of the type of wooden structural members and joint plates.

According to the invention, this is achieved in that the rod-like shank is provided at least at one of its ends with a boring part and at its other end with a tool drive for rotary motion, the diameter of the shank corresponding at least approximately to the boring diameter of the boring part at least over one or more partial regions of its length, and in that means for securing against axial displacement in the inserted condition are formed on the shank.

By means of the invention, the hole at least in the joint plate or if necessary both in the joint plate and in the wooden structural member can be made in one working step, specifically by the rod-like connecting element, which ultimately brings about mutual connection of joint plate and wooden structural member in this hole. Since the connecting element therefore makes the hole in the joint plate and simultaneously forms the connection between these two parts in one working operation, the holes in the joint plate and in the wooden structural member always match with accurate fit. Thereby there is achieved an exact and displacement-proof joint between the joint plate and the wooden structural member. In this respect it is inherently immaterial whether, in the case of arrangement of a plurality of connecting elements to be inserted parallel to each other, these are now oriented exactly parallel to each other or include an acute angle therebetween. Each connecting element in itself establishes between the wooden structural members and the joint plate an optimal fastening with exact fit and layout.

The connecting element is held interlockingly and/or frictionally in the hole of the joint plate and/or in the wooden structural member in such a way that it is secured against axial displacement. Precisely by virtue of the chips produced during the drilling process, an additional intimate connection is created between the connecting element and the joint plate or the wooden structural member, so that the mere action of driving in the connecting element can secure it interlockingly and/or frictionally against axial displacement. Of course, other additional means can certainly also be used to bring about an interlocking and/or frictional and captive holding relationship.

By the use of the connecting element according to the invention, it is also possible to push into one another or place against one another a wooden structural member with predrilled holes and a joint plate, after which a connecting element is introduced into the predrilled hole in the wooden structural member and thereafter the hole in the joint plate itself is made. In this way it is possible to use holes already drilled in the factory as a kind of gauge for subsequently drilling through the joint plate. Even in such a sequence of the method, the hole in the joint plate itself is made by the connecting element, which simultaneously brings about mutual connection of the wooden structural member and the joint plate. In this case also an exact fit is achieved between the holes in the wooden structural member and in the joint plate, and so the connecting element joins the wooden structural member and the joint plate to one another in firmly seated relationship.

The connecting element does not even have to pass completely through the wooden structural member. The setting process for the connecting element can therefore be ended before a through hole has been made. Thereby the type of the mutual joint is not even visible on one side of a wooden structural member. In this way the joint can be concealed or kept invisible on one side of the wooden structural member, thus satisfying esthetic principles. From the strength viewpoint, a through hole is not necessary for the joint, since it would be sufficient for the connecting element to penetrate at least a certain distance into the wooden structural member starting from both sides of a joint plate.

By these features according to the invention there is created a connecting element which is particularly suitable for this very special purpose. Heretofore, screws have already been used for fastening sheet-metal connectors or the like, which are disposed on the surface of wooden structural members. In wood construction in itself, and especially in the mutual fastening of wooden structural members and joint plates, there has been no use heretofore of self-drilling connecting elements. Precisely in the embodiment specifically under consideration here, however, the construction of a connecting element as a kind of rod-like shank with an appropriate boring part represents a substantial advance. The necessary hole can be made in one working operation with such a connecting element. In addition, the connecting element disposed in this hole to connect the joint plate and the wooden structural member is then also available immediately. Moreover, a mutual fixation which is exact and resistant to transverse displacement is possible with such a connecting element. A proper hole can be made optimally both in the wooden structural member and in the metal joint plate by means of an appropriately shaped boring part.

In a further proposal, one or more flute(s) is or are formed on the boring part and possibly on a portion of the rod-like shank adjoining the boring part. By virtue of such flutes the possibility is created that worked-off material produced during the drilling process can be appropriately transported and received. In this respect there is no need for the chips to be conveyed to the open, but instead it is sufficient for the produced chips to be received in compacted form in the flutes. It is then also immaterial whether one or the other metal chip becomes embedded in the hole wall in the wooden structural member, since this in no way compromises the ultimate fit. The connecting element which itself makes the hole ultimately remains, in fact, in the said hole.

In one alternative embodiment it is proposed that a portion with diameter smaller than that of the boring part directly adjoin the boring part. Thereby a larger receiving capacity for the drill chips is created in the region directly adjoining the boring part.

In a special embodiment of the invention it is provided that a further boring portion with boring diameter larger than that of the first boring part be formed on the rod-like shank offset at an axial distance from the boring part. In this way, completion of the hole and the quantity of chips produced can be divided between two drilling processes performed consecutively in the same working operation. This is advantageous precisely in the case of correspondingly thicker connecting elements.

To create a particularly large receiving capacity for the drill chips produced, it is proposed that one or more flute(s) be extended over a large part of the length or over the entire length of the rod-like shank.

In a further alternative embodiment, a thread or a thread-like structure is provided at least over a partial region of the length of the rod-like shank. Additional particular security against axial displacement of the connecting element is achieved thereby, and so the connecting element cannot be loosened once finally set, even in the event of shrinkage in the region of the wooden structural member.

In other possible embodiments in this context, it is proposed that a roughened surface, knurling or the like be provided or that raised structures or depressions be formed at least over a partial region of the length of the rod-like shank. In this way also additional security against twisting and displacement of the connecting element can be achieved, thus preventing extraction of the connecting element from the finished hole after final setting.

To close off the beginning of the hole optimally and to achieve appropriate sealing of the wood in this region, it is proposed that the end of the rod-like shank remote from the boring part have flaring frustoconical shape. Such a flaring frustoconical shape naturally can also be used in order to increase the torque appropriately. In this way the further driving-in process could be stopped in torque-dependent manner.

A preferred embodiment provides that one or more flute(s) is or are formed on the portion of the rod-like shank which follows the portion of reduced diameter and which is adapted at least approximately to the boring diameter. Thus a larger annulus for receiving chips is created not only directly following the boring part, but there adjoining there are also provided flutes which can receive drilled material, even though the flutes do not already have to extend directly from the boring part itself. Thereby it is also specially ensured that the torque on the connecting element to be screwed in is not excessively increased by correspondingly large production of drill chips.

For the special type of application of the connecting element according to the invention, it is particularly advantageous for the tool drive to be formed as an internal drive. Not only a specially shaped internal drive but also a kind of screw slot can be regarded as one kind of such an internal drive. This ensures that even the driven end of the connecting element can be driven in sufficiently by simple means until it is below the surface of the wooden structural member.

Within the scope of the invention, however, it is also possible for the tool drive to be formed as an external drive, in which case an external hexagon, for example, can be provided. Since this external drive must have appropriately small cross section, especially if the connecting element is to be countersunk, the possibility that external drives can be used depends on the torque to be transmitted.

In a special embodiment of the connecting element, and especially when the connecting element must have appropriately larger diameter, it is provided that the further boring portion with boring diameter larger than that of the first boring part is followed on the rod-like shank by a substantially cylindrical portion with diameter slightly smaller than that of the further boring portion. Although this further boring portion makes a slightly larger hole, the rod-like shank following it is held fixedly with excellent fit both in the joint plate and in the wooden structural member. Nevertheless, it is ensured that the torque will be increased excessively in the event of zero clearance. In this way the torque required to achieve drilling and to advance the connecting element is appropriately balanced with the necessary fit between the holes.

In one embodiment of the connecting element, one or more helical flute(s) is or are provided. In this case the drill chips produced are transported in the helical flutes toward the driven end of the connecting element, for practical purposes in the same manner as with a twist drill. Thereby it is ensured that the flutes are for practical purposes filled completely with drill chips until the connecting element has been finally set, and so there is obtained a connecting element with substantially continuously cylindrical form and full surface contact with the wall of the hole.

Within the scope of the invention, however, it is also conceivable for one or more flute(s) to be disposed parallel to the axis. In such flutes, the transport effect of the chips for practical purposes no longer exists, even if the connecting element is being turned, and so flutes in such an arrangement are filled in axial direction exclusively by drill chips which are being pushed back in axial direction.

Further features according to the invention and special advantages will be explained in more detail in the description hereinafter with reference to the drawings, wherein:

BRIEF DESCRIPTION OF THE DRAWINGS

FIG. 4 to FIG. 9 show several alternative embodiments of joints between wooden structural members and a joint plate, different constructions of connecting elements also being inserted in some cases;

DETAILED DESCRIPTION

Figure 1:
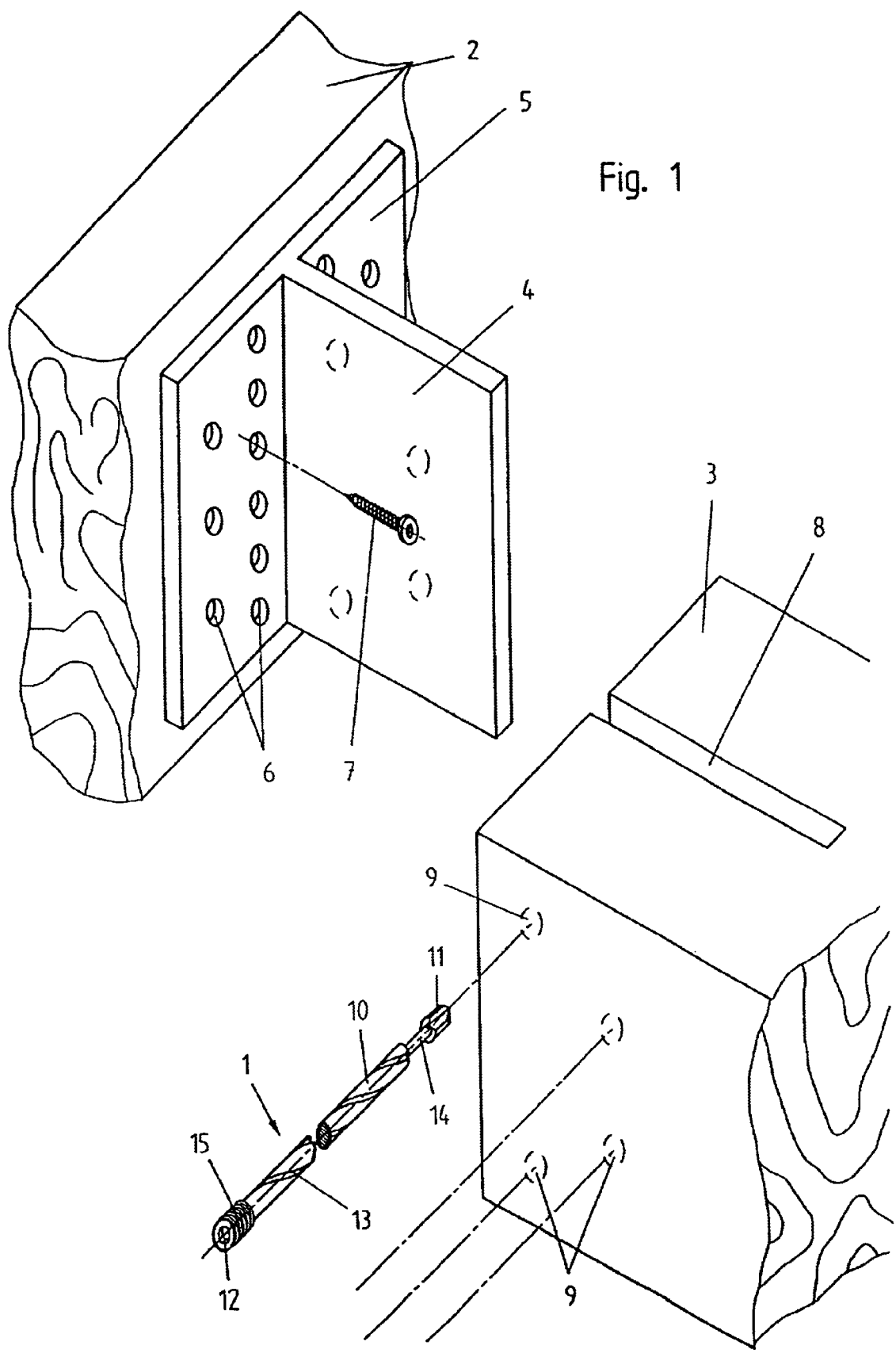
FIG. 1 shows an exploded diagram of a joint between two wooden structural members via a joint plate, the connecting element to be inserted also being illustrated.

The present invention therefore relates to a method and to an appropriate connecting element 1 for joining at least two wooden structural members 2 and 3. In the diagram according to FIG. 1, there is used for this purpose a joint plate 4, which is equipped with a foot part 5 disposed in transverse relationship thereto. Foot part 5 is provided with appropriate holes 6, in which screws 7 can be inserted. Joint plate 4 is therefore screwed abuttingly onto wooden structural member 2 via foot part 5. The end face, or in other words the free end of wooden structural member 3 is now brought up against wooden structural member 2. In wooden structural member 3 there is formed a slot 8, into which joint plate 4 can be pushed. In principle, it would also be conceivable to dispose joint plate 4 such that it adjoins the end of wooden structural member 3 on the outside thereof, but for reasons of better force transmission and force distribution an approximately central disposition of joint plate 4 in a slot 8 of wooden structural member 3 is advantageous. Once joint plate 4 has been pushed into slot 8, wooden structural members 2 and 3 are disposed in specified position relative to each other, and so now joint plate 4 and wooden structural member 3 can be fastened together. For this purpose there are used connecting elements 1, which are inserted into the solid material of wooden structural member 3 and of joint plate 4. Connecting element 1 itself makes the respective hole 9 in joint plate 4 and if necessary in wooden structural member 3 also, and thereupon functions directly as the connecting element which remains in self-made hole 9.

In this context, it is also possible that such a connecting element 1 does not extend completely through wooden structural member 3, or in other words its end does not penetrate completely through wooden structural member 3. This can be advantageous for esthetic reasons, but is also practical if, for example, the connecting element and the method according to the invention are being used in humid rooms, since boring part 11 of connecting element 1 should not be exposed, because it is made, for example, of carbon steel.

According to a slightly different method, it is also possible to provide wooden structural member 3 with holes already drilled in the factory, in which case joint plate 4, which is not yet provided with holes, is inserted in slot 8. Predrilled holes 9 then for practical purposes form a kind of drilling gauge, into which connecting elements 1 are inserted. Connecting elements 1 would then have to make only the hole in joint plate 4, immediately after which they are inserted as appropriate connecting elements between joint plate 4 and wooden structural member 3.

By the very use of a self-drilling connecting element, there can be achieved, in joining at least two wooden structural members via a joint plate, a substantial improvement, which not only is manifested in simpler and faster handling but also ensures that each connecting element used is inserted with exact fit, thus creating optimal force transmission without the possibility of transverse displacement. By special design of the connecting element, the diameter of the hole to be made can be matched exactly to the diameter of the connecting element, and so an optimal fit is made possible.

Figure 3:
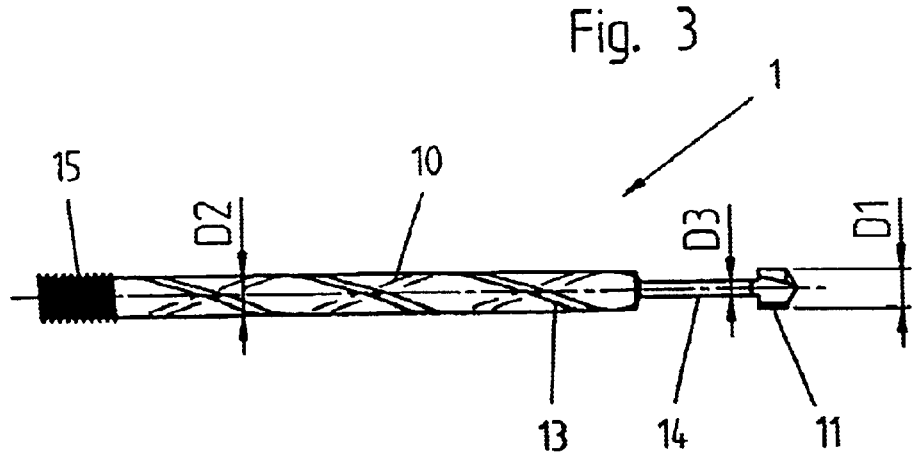
FIG. 3 shows a view of a special connecting element according to the diagram in FIG. 1.

In the embodiments according to FIGS. 1 and 3, connecting element 1 to be used according to the invention comprises substantially a rod-like shank 10, which is provided at one of its ends with a boring part 11 and at its other end with a tool drive 12 in the form of an internal drive. Diameter D2 of shank 10 is fashioned over at least one or more partial regions of its length to correspond at least approximately to boring diameter D1 of boring part 11 and, while connecting element 1 is in final position, must be present in the region of joint plate 4 and in the nearest possible regions of wooden structural member 3 which follow it. An appropriate fit between completed hole 9 and shank 10 must be achieved at least where the greatest shear forces occur in the joint between joint plate 4 and wooden structural member 3.

Appropriate flutes are of course provided on boring part 11 itself. In connecting element 1 according to the invention, however, one or more flutes 13 is or are also formed, at least in the embodiment according to FIGS. 1 and 3, on the region of shank 10 adjoining boring part 11. In the illustrated embodiment these flutes 13 are helical, which is advantageous in particular as regards material transport for the worked-off drill chips. It is certainly not intended that the worked-off material absolutely be transported into the open, but instead that it be received under certain circumstances in appropriately compacted form in the hole itself or in appropriate recesses of connecting element 1. In this context, it is also possible for one or more flutes to be disposed parallel to the axis. Such flutes are then not filled constantly by material being pushed back by the turning process during drilling, but they receive the chips adhering to the hole wall or are filled by chips being pushed back axially.

It is expedient for flutes 13 to extend over a large part of the length or over the entire length of rod-like shank 10, and certainly at least as far as this has diameter D2. Of course, the flutes can also be made appropriately shorter depending on the chips produced by the drilling process.

In the embodiment according to FIGS. 1 and 3, it is further provided that a portion 14 with diameter D3 smaller than that of boring part 11 directly adjoins boring part 11. By this construction there is created an additional annular space for receiving drill chips, directly following boring part 11. Portion 14 need only have a diameter D3 capable of transmitting the torque for the drilling process. As regards transmission of forces between joint plate 4 and wooden structural member 3, however, this portion 14 has no further influence, since it is disposed far outside joint plate 4 inserted in slot 8.

By virtue of portion 14, which has smaller diameter and follows boring part 11, the portion of rod-like shank 10 having diameter D2 begins at an appropriate distance from boring part 11. Boring diameter D1 of boring part 11 is matched approximately to diameter D2 of shank 10, especially for achieving an optimum fit. In the illustrated embodiment, the portion of shank 10 with diameter D2 is provided with helical flutes 13 over its entire length. It is precisely with such an embodiment that a relatively large space for receiving drill chips can be created by the annular space provided in the region of portion 14 and by flutes 13 which then adjoin it.

At the end of connecting element 1 remote from boring part 11 there is formed a thread 15, which for practical purposes bites into completed hole 9 during the last turning movements of the drilling process. This thread 15 ensures that connecting element 1 is secured axially and therefore cannot escape spontaneously from completed hole 9 if it is not exposed directly to sufficient shear forces or if shrinkage develops in the region of wooden structural member 3. Other thread-like structures could also be provided instead of thread 15, in which case it is also conceivable to provide a plurality of circular circumferential ribs which are disposed parallel to each other and which in cross section, for example, have a sawtooth profile. The intention here is simply to create an additional possibility of holding connecting element 1 securely against displacement in its axial direction.

A further alternative embodiment in this context could be to provide a roughened surface, knurling or the like, or else to form other raised structures or depressions. In all of these embodiments, spontaneous twisting and spontaneous axial displacement of the connecting element will be prevented.

In the embodiment according to FIG. 1 and other illustrated embodiments, there is illustrated an appropriate slot 8, which passes completely through the entire height or thickness of wooden structural member 3. An embodiment is also conceivable, of course, in which this slot 8, viewed in its plane, does not pass completely through but for practical purposes is machined as a mortise with rectangular cross section at the end face of wooden structural member 3, into which mortise joint plate 4 is inserted. In this case, all that can be seen of wooden structural member 3 after connecting element 1 has been inserted is that a joint has been made here with a joint plate, specifically because slot 8 and thus also the arrangement of joint plate 4 are no longer visible externally.

Figure 2:
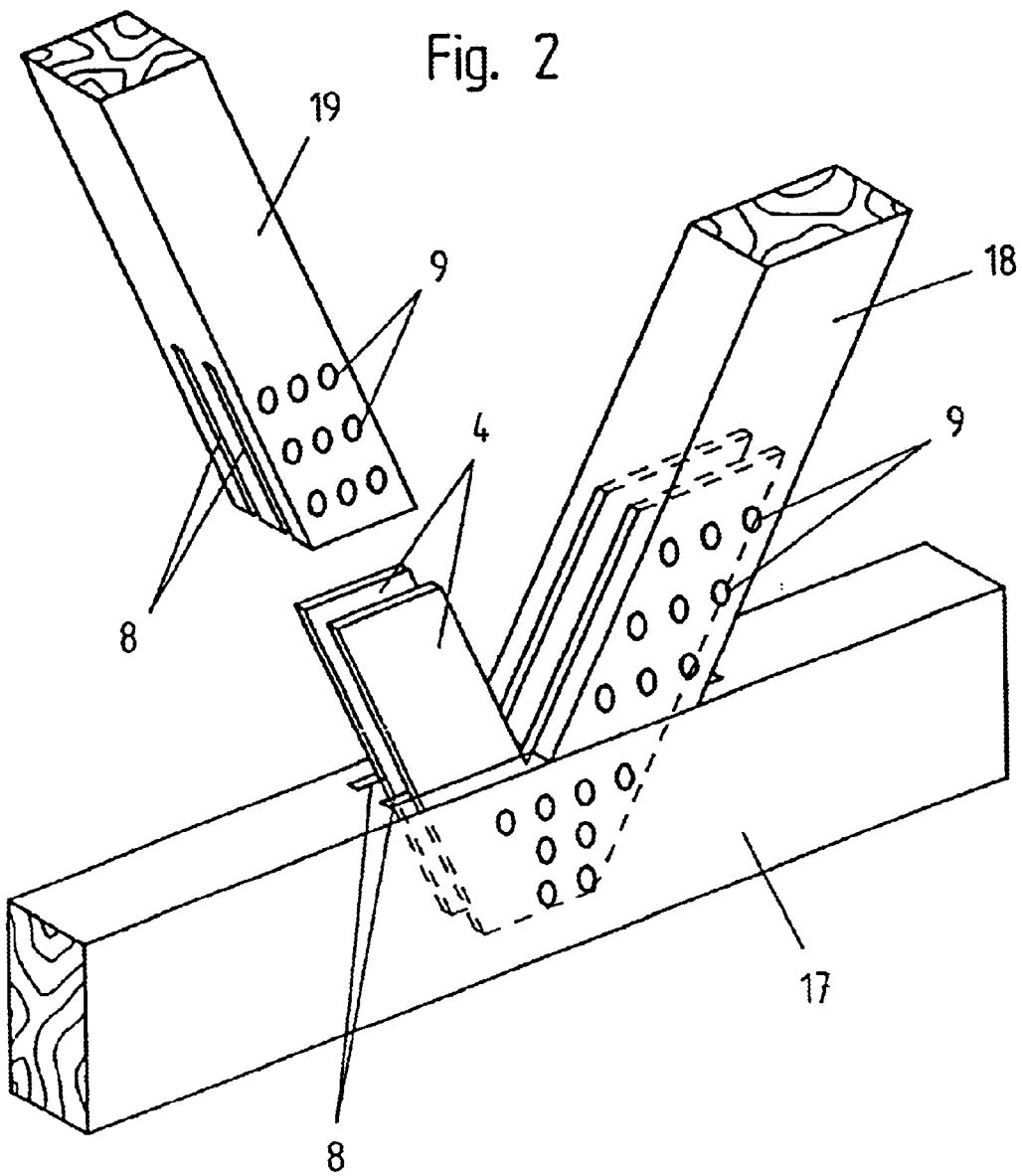
FIG. 2 shows an embodiment of a joint between wooden structural members with a special kind of joint plate.

In the construction illustrated in FIG. 2, wooden structural members 17, 18 and 19 are joined to each other by substantially vee-shaped joint plates 4. In this way a kind of wooden truss can be made, in which joint plates 4 and connecting elements 1 are used for mutual joining. In this case also there are formed, at the ends of wooden structural members 18 and 19, slots 8 into which joint plates 4 can be inserted. Wooden structural member 17 is also provided with slots 8, into which there is joined a kind of web part of the two joint plates 4 aligned at an acute angle to one another. By direct insertion of connecting elements 1, holes 9 are made both in wooden structural members 17, 18, 19 and in joint plates 4, thus simultaneously forming a joint with accurate fit. In such an arrangement also it is of course possible to provide that holes 9 in wooden structural members 17, 18 and 19 are already made in the factory, and so only the holes in joint plates 4 then have to be made by the connecting elements according to the invention. In such an embodiment, boring part 11 of connecting element 1 according to the invention certainly has to pass through two joint plates 4 disposed at a distance from one another. It is therefore particularly important for the connecting elements and the holes to be exactly matched to each other, which can be achieved only by precisely the present invention, or in other words when the connecting element itself drills the hole in which it will ensure force transmission by its proper fit.

FIG. 4 shows for practical purposes a section through a configuration as it would exist in the finished joint of the embodiment according to FIG. 1. It is therefore clear here that the length of the entire connecting element 1 must be equal to or shorter than the thickness of wooden structural member 3, measured in axial direction of connecting element 1. It is also clear that, because of the reduced diameter of portion 14 and because of flutes 13 formed additionally in shank 10, a relatively large space for receiving the drill chips is created. If connecting elements 1 were to be shorter, it would have to be ensured that boring part 11 has already drilled through joint plate 4 before thread 15 disposed at the rear end of connecting element 1 enters the hole. Because of the very small distance advanced during drilling in joint plate 4, the engagement necessary for retention in the region of thread 15 would be destroyed, since the wood in the region of the hole wall would be completely reamed out.

The configuration according to FIG. 5 shows that there is provided, offset at an axial distance from boring part 11, a further boring portion 20 with a boring diameter larger than that of first boring part 11. Thereby the hole to be made can be bored out in stages. This design is useful precisely when a connecting element with larger diameter D4 is to be inserted. In this case, therefore, further boring portion 20 is followed by a rod-like shank 10 with diameter D4, and diameter D4 of shank 10 can be made slightly smaller than the boring diameter of further boring portion 20. Such a feature ensures that hole friction between connecting element 1 and hole 9 is not too great, and so the boring process can be completed as far as final setting of the connecting element without excessive torque increase. Within the scope of the invention, it is conceivable to provide more than two stages of different diameters of boring portions, depending on the corresponding diameter D4 of shank 10.

From FIGS. 6 to 8 it is evident that the most diverse alternative embodiments of connecting elements can absolutely be used, and that portions 14 of reduced diameter, flutes 13 or other embodiments can be combined with each other in appropriate ways. In the embodiments according to FIGS. 6 to 8 it is additionally provided that a flaring frustoconical portion 21 is formed on the end of shank 10 remote from boring part 11. In this way the hole wall is further correspondingly compacted in the end region, thus preventing a frayed pattern of chips from forming at the surface of wooden structural member 3. In these arrangements also there is provided a tool drive 12 in the form of an internal drive, which can also be formed as a kind of screwdriver slot.

In the embodiment according to FIG. 9 there is provided a tool drive 16 in the form of an external drive, in which case it must be ensured, of course, that an appropriate torque can be transmitted and also that the free end containing tool drive 16 can be countersunk in wooden structural member 3. Thus appropriate adaptation to a tool also has to be achieved.

FIG. 9 further shows an embodiment of a connecting element 1 provided at the surface with one or more raised structures 22. It is conceivable in this case that such raised structures 22 will eventually be disposed in the region of the wooden structural member or in the region of joint plate 4 once connecting element 1 has been finally set. Security against twisting and displacement is also achieved with such an arrangement.

Figure 10:
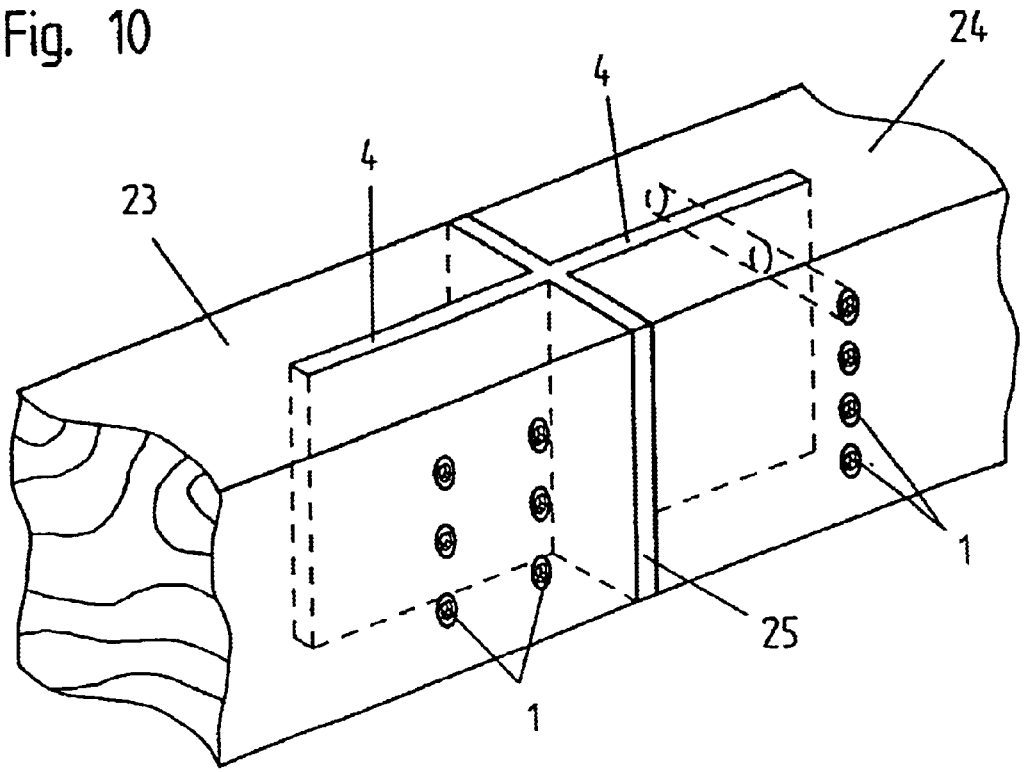
FIG. 10 and FIG. 11 show two embodiments for joining two wooden structural members adjoining one another at their end faces with appropriately shaped joint plates.
Figure 11:
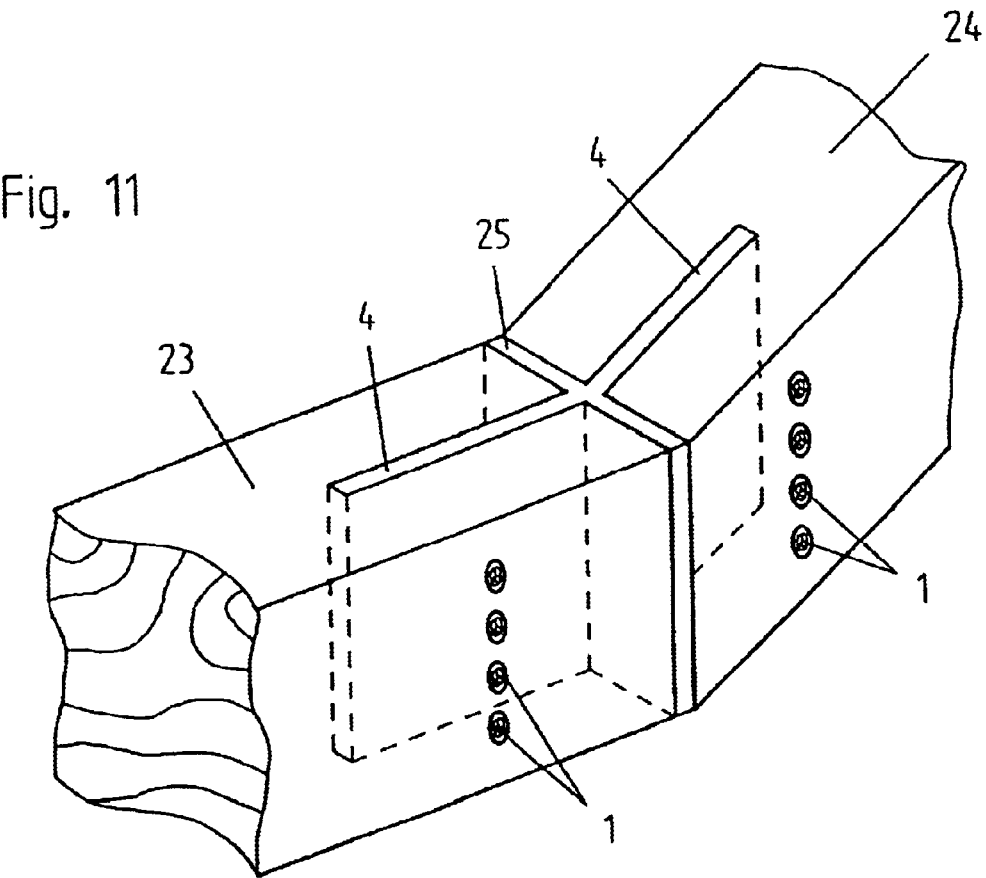

The embodiments according to FIGS. 10 and 11 demonstrate that not only wooden structural members brought up against each other at right angles or wooden structural members brought up against each other in the manner of a truss, but also wooden structural members 23, 24 brought up against each other abuttingly with their end faces can be joined together with a joint plate 4. In this case there are provided joint plates 4 projecting in two opposite directions from a transverse plate 25 and extending into corresponding slots at the ends of wooden structural members 23, 24. As a result, it is also possible, as can be inferred from FIG. 11, that the two wooden structural members 23, 24 can adjoin one another at an obtuse angle, thus also achieving the possibility that joint plates 4 can be disposed at an appropriate angle to one another or to intermediate plate 25. In this case also, the joint is again made by connecting elements 1 according to the invention, which bore through wooden structural members 23, 24 and joint plates 4 and then themselves complete the joint.

In the foregoing description, reference was made to a tool drive 12 or 16 in the form of an internal or external drive. Within the scope of the invention it would be entirely conceivable to equip connecting element 1 according to the invention with a head in the same manner as for a screw, which head would then be provided with an appropriate internal or external drive. In such a construction, however, it must be kept in mind that the connecting element may well be almost impossible to countersink completely at its driven end, since the head actually extends correspondingly beyond the diameter of shank 10.

Connecting element 1 can also be made of, for example, stainless material, in which case the boring portion is made hardenable for the necessary boring process. It is also possible to weld on a boring part or to insert an appropriate boring tip of, for example, carbon steel.

It was also assumed in the foregoing description that a joint plate of metal such as steel or aluminum is used. If the material were sufficiently strong, it would also be conceivable to use a joint plate of plastic, in which case the method according to the invention and the connecting element can of course also be used for such a construction.

What is claimed is:

1. An assembly of at least two wooden structural members, comprising:
   said at least two wooden structural members confronting each other, at least one wooden structural member having a slot that opens toward another wooden structural member,
   a joint plate extending from said other wooden structural member into said slot,
   a connecting element having a shaft disposed through said joint plate and comprising at one end a boring portion for penetrating said at least one wooden structural member on both sides of said joint plate,
   means for preventing axial displacement of said connecting element within said at least one member, the means for preventing axial displacement being located on the shaft, and
   a portion of said connecting element, located at an intermediate postion along the shaft, is constructed and arranged to recieve chips created by penetration of any one of the group of said at least one wooden structural member, said other wooden structural member, and said joint plate by said boring portion.

2. The assembly of claim 1 wherein said connecting element extends through a hole in said joint plate.

3. The assembly of claim 2 wherein said hole has been created by said boring portion.

4. The assembly of claim 1 wherein said connecting element is formed of metal.

5. The assembly of claim 1 wherein said means for preventing axial displacement is a thread formed on an end of said connecting element opposite from the boring portion.

6. The assembly of claim 1 wherein said shaft has a smaller diameter than said boring portion.

7. The assembly of claim 5 wherein said thread is at least partly embedded in said at least one wooden member.

8. The assembly of claim 1 wherein at least one flute is formed along at least a portion of the connecting element.

9. The assembly of claim 1 wherein a shaft portion of the connecting element has a diameter greater than that of the boring portion, the shaft portion of the connecting element being axially offset from said boring portion.

10. The assembly of claim 1 wherein the boring portion does not extend all the way through the at least one wooden structural member.

11. The assembly of claim 1 which is formed in a single operation by using said boring portion to penetrate both said at least one wooden structural members and to create said hole in said joint plate.

12. The assembly of claim 1 wherein the at least one wooden structural member has a distal end that confronts the other wooden structural member.

13. The assembly of claim 1 wherein the at least one wooden structural members has a distal end that confronts a longitudinal side of said other wooden structural member.

14. A method of making the assembly of claim 1, comprising the steps of
   inserting said joint plate in said slot and, in a single operation,
   boring aligned holes in said joint plate and in said at least one wooden structural member on both sides of said joint plate.

\* \* \* \* \*